United States Patent Office 3,342,875
Patented Sept. 19, 1967

---

3,342,875
HYDROGEN CAPPED FLUOROCARBON POLYETHERS
Stanley Selman, Wilmington, and Wilburn Suber Smith, Jr., New Castle, Del., assignors to E. I. du Pont de Nemours and Company, Wilmington, Del., a corporation of Delaware
No Drawing. Filed Mar. 26, 1962, Ser. No. 182,618
9 Claims. (Cl. 260—615)

The present invention relates to novel fluorocarbon ethers, and, more particularly, to fluorocarbon polyethers which are capped with hydrogen.

Fluorocarbon polyethers are obtained by the polymerization of fluorocarbon epoxides such as tetrafluoroethylene epoxide or hexafluoropropylene epoxide, as illustrated by the following equations:

(I)

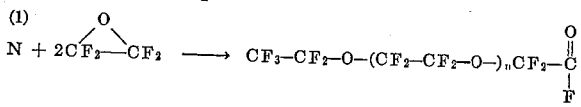

(II)

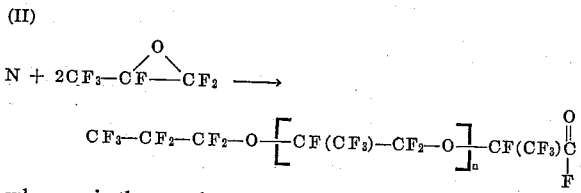

where $n$ is the number of repeating epoxide units formed from N molecules of the epoxide. Additionally, fluorocarbon polyethers of slightly differing structures may also be prepared by polymerization of these epoxides in the presence of an acid fluoride, as illustrated by the following equations:

(III)

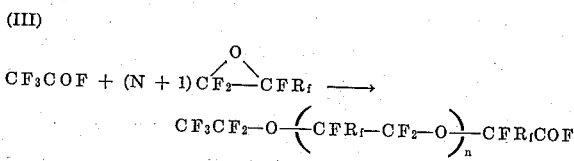

(IV)

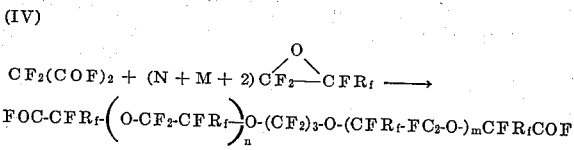

where $R_f$ is a fluorine or a trifluoromethyl radical and $n$ and $m$ are numbers of repeating epoxide units in the polyether chains derived from N and M molecules of the epoxide. The polymerization illustrated is broadly applicable to fluorocarbon acid fluorides which can be monobasic or dibasic.

The fluorocarbon polyethers illustrated in the foregoing equations can be prepared by a number of methods. Thus, hexafluoropropylene epoxide and tetrafluoroethylene epoxide are polymerized in accordance with Equations I and II using bulk polymerization techniques and an active charcoal catalyst. Hexafluoropropylene epoxide can also be polymerized employing a monovalent metal fluoride or a quaternary ammonium or phosphonium salt as the catalyst in organic polar solvents, such as the dimethyl ether of ethylene glycol, the dimethyl ether of diethylene glycol, dioxane, acetonitrile, propionitrile and benzonitrile. The preferred classes of organic polar solvents are aliphatic polyethers having from 4 to 10 carbon atoms and hydrocarbon nitriles having from 2 to 10 carbon atoms. However, other organic polar solvents, such as nitroethane, tetrahydrofuran, dimethylsulfoxide, acetone and ethyl acetate, may also be employed as reaction diluents. Tetrafluoroethylene epoxide may also be polymerized using quaternary ammonium and phosphonium salts as catalysts in halogenated solvents such as methylene chloride, chloroform, and 1,1,2,2-tetrafluoro-3-chloropropane. The reactions described in Equations III and IV are carried out by employing the aforementioned ionic catalysts and reaction diluents in the presence of a fluorocarbon acid fluoride. As is apparent from the equation, both mono- and diacid fluorides can be employed. Suitable acid fluorides include carbonyl fluoride, trifluoroacetyl fluoride, perfluoropropionyl fluoride, oxalyl fluoride, diacid fluorides of perfluoromalonic acid, perfluorosuccinic acid, perfluoroglutaric acid and perfluoroadipic acid, perfluoroheptanoyl fluoride and similar acid fluorides. In addition to the completely fluorinated acid fluorides, there may also be reacted with the fluorocarbon epoxide substantially perfluorinated acid fluorides having the general formula $XR'''_fCOF$ in which $R'''_f$ is a perfluoroalkylene radical, such as perfluoromethylene, perfluoroethylene or perfluorotrimethylene, and X is a hydrogen or a different halogen.

It is an object of the present invention to improve the chemical stability of the described fluorocarbon polyethers by chemically modifying the carbonyl fluoride endgroup of the fluorocarbon polyether.

The hydrogen modified fluorocarbon ethers of the present invention have the general formulas $$XR'_f\text{—O}(CFR_f\text{—}CR_2\text{—O—})_nCFR_fH$$

and

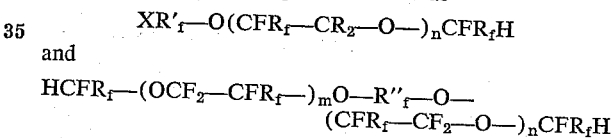

where $R_f$ is a fluorine or a trifluoromethyl radical, $R'_f$ is a perfluoroalkylene radical having preferably from one to five carbon atoms, X is a radical selected from the class consisting of hydrogen and halogen, $R''_f$ is a perfluoroalkylene radical having at least two carbon atoms, and, preferably from two to ten carbon atoms, and $n$ and $m$ are integers, representing numbers of repeating fluorocarbon epoxide units in the polymer, which can vary from 0 to 50.

The hydrogen capped fluorocarbon ethers of the present invention are obtained by one of two reactions. Thus, they may be obtained by the pyrolysis of a hydrogen containing derivative of the ether, such as the fluorocarbon ether acid or the ammonium salt of the fluorocarbon ether acid, or they may be obtained by the reaction of a monovalent metal salt, preferably an alkali metal salt, of a fluorocarbon polyether acid of the type illustrated in reactions I through IV hereinabove with water or an organic solvent which contains an active hydrogen. Although water can be used in this reaction, it is not preferred since high temperatures are required to form the hydrogen capped fluorocarbon ether. In general, the organic solvents are hydroxyl group containing hydrocarbon solvents such as alcohols, acids and phenols. In a preferred embodiment, the active hydrogen containing solvent is employed as an aqueous solution. A preferred class of these reagents are aliphatic mono- and polyhydric alcohols. Examples of such reagents are methanol, ethanol, butanol, ethylene glycol, diethylene glycol, cyclohexanol, propylene glycol, trimethylene gycol and glycerol. However, other active hydrogen containing solvents may also be used. These include acetic acid, propionic acid, phenol, etc.

The formation of the hydrogen modified fluorocarbon polyethers of the present invention as applied to homopolymers of the epoxides may be illustrated by the following equations:

$$CF_2R_f-CF_2-O-(CFR_f-CF_2-O)_n-CFR_fCOF$$

$$\downarrow H_2O$$

$$CF_2R_f-CF_2-O-(CFR_f-CF_2-O-)_nCFR_fCOOH + HF$$

$$\downarrow MOH \quad \overset{\Delta}{\underset{}{\to}} CF_2R_f-CF_2-O-(CFR_f-CF_2-O-)_nCFR_fH$$

$$CF_2R_f-CF_2-O-(CFR_f-CF_2-O-)_nCFR_fCOOM + H_2O$$

$$\downarrow ROH$$

$$CF_2R_f-CF_2-O-(CFR_f-CF_2-O-)_nCFR_fH + ROM + CO_2$$

where $R_f$ and $n$ have the same meaning as above, M is a monovalent metal and ROH is an active hydrogen containing solvent. The foregoing reaction scheme is also applicable to adducts of perfluorocarbon acid fluorides and fluorocarbon epoxides. These are formed using organic polar solvents and ionic catalysts described above. By employing mild conditions and excess quantities of the acid fluoride, polymerization of the epoxide is substantially suppressed. These compounds, therefore, have the formulas $XR'_f-O-CFR_fCOF$ and $$R''_f[-O-CFR_f-COF]_2$$

in which $R_f$, $R'_f$, $R''_f$ and X have the same meaning as above.

The hydrolysis of the acid fluoride of the fluorocarbon ether occurs on contact of the ether with water. The formation of the monovalent metal salt is similarly obtained by contacting the acid with an aqueous solution of the metal hydroxide. The salt, furthermore, can be directly formed by the reaction of the fluorocarbon ether acid fluoride with an aqueous solution of the metal hydroxide.

The reaction of the fluorocarbon ether acid salt with the active hydrogen containing reagent can be carried out over a wide temperature range from 0 to 300° C., if desired. However, a fast and complete reaction is obtained if temperatures in the range of 100 to 300° C. are employed. The hydrogen capped fluorocarbon ether is formed when the two reagents are combined. In a preferred technique, the two reagents are admixed and the resulting mixture is distilled. The hydrogen capped fluorocarbon ether distills out of the mixture. For higher molecular weight fluorocarbon ethers that cannot be readily distilled, other suitable methods will be apparent to those skilled in the art. The quantity of solvent is not critical, but is preferably employed in excess of the stoichiometric quantity required. If desired, the formation of the acid salt may be carried out in situ by admixing the acid, the active hydrogen containing compound and the metal hydroxide simultaneously, i.e., combining steps two and three in the foregoing reaction scheme. It is also feasible to combine all three steps and thus use the fluorocarbon ether formed by the polymerization of the epoxide or the reaction of the epoxide with an acid fluoride. The pyrolysis of the hydrogen containing derivative of the fluorocarbon ether is carried out at temperatures of 115° to 450° C., in accordance with techniques well established in the art for the pyrolysis of fluorocarbon compounds.

The preparation of the fluorocarbon ethers employed as starting materials in the process of the present invention is illustrated by the following specific examples: Into a 50 ml. glass reaction flask was charged 2 ml. of the dimethyl ether of diethylene glycol and 0.1 g. of cesium fluoride. Hexafluoropropylene epoxide was then charged to the reaction vessel until a pressure of 5 p.s.i. was attained. The vessel was agitated at a temperature of 25 to 30° C. for a period of one hour. The pressure was maintained at the indicated level by the further addition of the epoxide. The resulting product being insoluble in the diluent was separated and 57 g. of a fluorocarbon polyether was obtained having the formula $$CF_3CF_2CF_2-O-[CF(CF_3)-CF_2-O]_nCF(CF_3)-COF$$

where $n$ varied from 4 to 6. The fluorocarbon polyether having the formula $$CF_3-O-[CF(CF_3)-CF_2-O]_nCF(CF_3)COF$$

is obtained by carrying out the foregoing reaction in the presence of carbonyl fluoride. If the reaction is carried out in the presence of oxalyl fluoride, a fluorocarbon polyether having the formula $$COF-(CF_3)CF[O-CF_2-CF(CF_3)]_nO-CF_2-$$
$$CF_2-O[CF(CF_3)-CF_2-O]_mCF(CF_3)COF$$

is obtained.

Into a dry pressure vessel stirred with a magnetic stirrer was added 160 mg. of tetraethyl ammonium cyanide and 8 ml. of a halogenated solvent having the formula $$CHF_2(CF_2)_3CH_2Cl$$

The flask was cooled to −40° C. and 38.1 g. of trifluoroacetyl fluoride and 155 g. of tetrafluoroethylene epoxide were added slowly over a 4.5 hour period. The temperature of the reaction mixture was maintained at −35°±5° C. and the pressure of the mixture ranged from 44 p.s.i. initially to −20″ Hg vacuum, at the end of the reaction. The drop in pressure indicates a nearly quantitative conversion of the reagents. Fractional distillation resulted in a fluorocarbon ether and fluorocarbon polyether having the general formula $$CF_3-CF_2-O-[CF_2-CF_2-O-]_nCF_2-COF$$

where $n$ varied from 0 to 6. Similar products, but of higher molecular weight, are obtained in the absence of the trifluoroacetyl fluoride. In the presence of a diacid fluoride a fluorocarbon polyether having two carbonyl fluoride end groups is obtained.

The present invention is further illustrated by the following examples.

EXAMPLE I

Into a distillation flask containing 150 ml. of water and 150 ml. of ethylene glycol was added 44.15 g. of a polytetrafluoroethylene epoxide ether having the formula $$F-(CF_2-CF_2-O)_4CF_2COF$$

The mixture was made alkaline and distilled. Over the range of 100 to 140° C. water distilled from the mixture. In the range of 140 to 190° C. a mixture of water and 22 ml. of a fluorocarbon distillate was collected. After separation, drying and distillation 27.5 g. of omega-hydrofluorocarbon polyether having the formula $$F(CF_2-CF_2-O)_4CF_2H$$

B.P. 128 to 129° C., F.P. −73 to −72° C., sp. gr. 1.6 was obtained.

*Analysis.*—Calcd.: C, 20.70; F, 65.51. Found: C, 20.9; F, 65.4.

EXAMPLE II

Into a distillation flask containing 400 ml. of ethylene glycol was added 465 g. of a hydrolyzed polyether of hexafluoropropylene epoxide having the formula $$F-[CF(CF_3)-CF_2-O]_3CF(CF_3)COOH$$

and 400 ml. of 2.5 molar KOH. The alkaline solution was slowly distilled at 115 to 200° C. over a three hour period. The water and 234 ml. of fluorocarbon distillate were collected and separated. After drying over $Na_2SO_4$ the fluorocarbon was distilled to yield 400 g. (93% yield) of pure hydroperfluoropropylene epoxide polyether having the formula $F-[CF(CF_3)-CF_2-O]_3CFHCF_3$, B.P. +151° to 152° C. Analysis by gas chromatography indicated a single compound. Analysis by IR showed the characteristic C—H bands at 3.4 and 6.8μ along with the broad CF absorption from 7.4 to 9.5μ and in addition bands at 10.1, 11.1, 12.3 and 13.3μ.

*Analysis.*—Calcd.: C, 21.37; H, 0.16; F, 70.70. Found: C, 21.57; H, 0.26; F, 72.38.

EXAMPLE III

Into a reaction flask cooled to −60° C. was placed 46.4 g. of 2-perfluoromethoxy-perfluoropropionyl fluoride and 32 g. of aqueous potassium hydroxide (concentration 50 wt. percent). The excess water in the mixture was then evaporated by applying a vacuum for a period of 24 hours and maintaining the salt at a temperature of 60° C. under an aspirator for a period of 12 hours. The resulting wet salt was heated to 230° C. and the products distilling out of the heated mixture were condensed. There was obtained 17.6 g. of product which on analysis by gas chromatography contained 86.9% of $CF_3-O-CFH-CF_3$.

EXAMPLE IV

Into a thin platinum tube was placed 2.6 g. of the ammonium salt of 2-perfluoropropoxy perfluoropropionic acid. The tube was heated to 225° C. and 200 atmospheres were applied to the tube. The tube was opened and the contents were distilled under vacuum into a nitrogen cooled graduate cylinder, and resulted in about 1.1 ml. of a clear liquid. Nuclear magnetic resonance analysis of this sample showed it to be $$CF_3-CF_2-CF_2-O-CFH-CF_3$$

Elemental analysis gave the following results. Calculated for $C_5F_{11}OH$: C=21%; F=73.1%. Found: C=20.8%, 20.7%; F=69.8%.

EXAMPLE V

Into a Carius tube was placed 0.2 g. of 2-perfluoropropoxy perfluoropropionic acid. The tube was sealed and heated at 380° C. for two hours. The resulting product was found to have the formula $$CF_3-CF_2-CF_2-O-CFH-CF_3$$

EXAMPLE VI

The potassium salt of perfluoro-3,6-dioxa-2,5-dimethyl-nonanoic acid, $$CF_3-CF_2-CF_2-O-CF(CF_3)-CF_2-O-CF(CF_3)-COOK$$

1.5 g., was mixed with 5 ml. of ethylene glycol in a flask fitted with a reflux condenser and a tube leading to a Dry Ice trap and vacuum line. The flask was placed in an oil bath maintained at 170° C. and liquid began to reflux immediately. The flask was removed from the bath and the product flashed off under reduced pressure. The distillate weighed 1.1 g. and was found to be a hydrogen capped fluorocarbon polyether having the formula $$CF_3-CF_2-CF_2-O-CF(CF_3)-CF_2-O-CFHCF_3$$

EXAMPLE VII

To a flask containing 50 g. of a viscous polytetrafluoroethylene epoxide oil, having the formula $$F(CF_2-CF_2-O)_nCF_2COF$$

where n varied from 1 to 30, was added 200 ml. of water and 200 ml. of ethylene glycol. The reaction mixture was made alkaline with potassium hydroxide and was heated for 8 hours from 80–135° C. The mixture was cooled and the lower fluorocarbon layer separated to give 32 g. of a hydrogen capped fluorocarbon ether having the general formula $F(CF_2-CF_2-O)_nCF_2H$, where n varied from 1 to 30. The product was identified by vapor phase chromatography and infrared analysis. Distillation gave 4 g. of product boiling from 91–125° C., 14.6 g. boiling from 125–133° C. at 21 mm., 12.2 g. boiling from 133° C. at 21 mm. to 198° C. at 2/10 mm. and 1.0 g. of high boiling oil. The infrared spectra of all fractions showed complete removal of carbonyl absorption and the presence of CH absorption.

EXAMPLE VIII

A 26.8 g. sample of a copolymer containing 81 mole percent tetrafluoroethylene epoxide and 19 mole percent hexafluoropropylene epoxide was stirred with 200 ml. of water and 200 ml. of ethylene glycol. Neutralization of the mixture with aqueous potassium hydroxide gave an average molecular weight of 4000 for the polymer and a range of 5 to 40 for the degree of polymerization. The alkaline mixture was stirred for 12 hours at 135° C., cooled and the lower fluorocarbon layer separated. The product weighed 20.1 g. and melted at 25–27° C. Distillation gave the following fractions:

| Fraction | Weight, g. | Boiling Point | Freezing Point, ° C. |
|---|---|---|---|
| 1 | 3.1 | 115° C./0.2 mm. to 70° C./0.2 mm. | |
| 2 | 2.5 | 170° C./0.2 mm. to 200° C./0.2 mm. | |
| 3 | 3.9 | 202° C./0.2 mm. to 258° C./0.2 mm. | 19.3 to 22 |
| 4 | 1.4 | 260° C./0.2 mm. to 264° C./0.2 mm. | 30 to 32.6 |
| 5 | 5.8 | Of higher boiling residue | |

The infrared absorption spectra for these materials indicated their complete conversion to hydrogen capped material.

EXAMPLE IX

Using the procedure of Example I, a fluorocarbon ether having the formula $C_2F_4[O-CF(CF_3)-COF]_2$ is converted into the hydrogen capped ether having the formula $C_2F_4(O-CFHCF_3)_2$.

EXAMPLE X

Using the procedure of Example I, a fluorocarbon ether having the formula $C_5F_{10}(O-CF_2-COF)_2$ is converted into the hydrogen capped fluorocarbon ether having the formula $C_5F_{10}(O-CF_2H)_2$.

EXAMPLE XI

Using the procedure of Example I, a fluorocarbon ether having the formula $$HC_5F_{10}-O[CF(CF_3)-CF_2-O]_2CF(CF_3)-COF$$

is converted into the hydrogen capped fluorocarbon ether having the formula $$HC_5F_{10}-O[CF(CF_3)-CF_2-O]_2CFHCF_3$$

The foregoing examples have illustrated the formation of the hydrogen modified fluorocarbon ethers of the present invention. As can be seen from the examples, the reaction leading to the formation of these fluorocarbon ethers is readily accomplished by admixing the polyether and the active hydrogen containing solvent and distilling the mixture. Various modifications of the reaction techniques illustrated by the examples will be apparent to those skilled in the art and are included in the scope of the invention.

The hydrogen modified fluorocarbon ethers of the present invention are chemically inert, and stable over a wide range of temperatures. They, furthermore, possess an extremely wide liquid state temperature range. In view of these properties, the hydrogen modified fluorocarbon ethers of the present invention have outstanding utility as lubricants, dielectric media and heat transfer media. The ethers, furthermore, are useful solvents and plasticizers for halogenated compounds and resins.

What is claimed is:

1. A hydrogen modified fluorocarbon ether having formulas of the class consisting of $$XR'_f{-}O({-}CFR_f{-}CF_2{-}O)_nCFR_fH$$

and $$HCFR_f{-}(OCF_2{-}CFR_f)_mO{-}R''_f\\{-}O{-}(CFR_f{-}CF_2{-}O{-})_nCFR_fH$$

where $R_f$ is a radical selected from the class consisting of the fluorine and the trifluoromethyl radical, $R_f'$ is a perfluoroalkylene radical of one to five carbon atoms, X is a radical selected from the class consisting of hydrogen and halogen, $R''_f$ is a perfluoroalkylene radical of at least two carbon atoms and $n$ and $m$ are integers from 0 to 50 inclusive.

2. A hydrogen modified fluorocarbon ether having the formula $$HCF_2{-}(OCF_2{-}CF_2)_mO{-}R''_f{-}O\\{-}(CF_2{-}CF_2{-}O)_nCF_2H$$

where $R''_f$ is a perfluoroalkylene radical having from two to ten carbon atoms and $n$ and $m$ are integers from 0 to 50 inclusive.

3. The hydrogen modified fluorocarbon ether of claim 2 wherein $R''_f$ is the tetrafluoroethylene radical.

4. A hydrogen modified fluorocarbon ether having the formula $XR'_f{-}O{-}(CF_2{-}CF_2{-}O)_nCF_2H$, where $R'_f$ is a perfluoroalkylene radical of one to five carbon atoms, X is a halogen and $n$ an integer from 0 to 50 inclusive.

5. A hydrogen modified fluorocarbon ether having the formula $XR'_f{-}O{-}[CF(CF_3){-}CF_2{-}O]_nCF(CF_3)H$, where $R'_f$ is a perfluoroalkylene radical of one to five carbon atoms, X is a halogen and $n$ an integer from 0 to 50 inclusive.

6. The hydrogen modified fluorocarbon ether of claim 5 wherein X is fluorine.

7. The hydrogen modified fluorocarbon ether of claim 6 wherein $R'_f$ is a difluoromethylene group.

8. The hydrogen modified fluorocarbon ether of claim 6 wherein $R'_f$ is a tetrafluoroethylene group.

9. The hydrogen modified fluorocarbon ether of claim 6 wherein $R'_f$ is a hexafluoropropylene group.

References Cited

UNITED STATES PATENTS

| | | | |
|---|---|---|---|
| 2,500,388 | 3/1950 | Simons | 260—615 X |
| 2,647,933 | 8/1953 | La Zerte et al. | 260—653 |
| 2,704,776 | 3/1955 | La Zerte et al. | 260—653 |
| 2,803,666 | 8/1957 | Miller et al. | 260—614 |
| 3,114,778 | 12/1963 | Fritz et al. | 260—615 X |
| 3,180,895 | 4/1965 | Harris | 260—614 |

FOREIGN PATENTS

| | | |
|---|---|---|
| 575,899 | 5/1959 | Canada. |
| 583,874 | 1/1947 | Great Britain. |

OTHER REFERENCES

La Zerte et al., Jour. Amer. Chem. Soc., vol. 75 (1953), pages 4525–4528.

LEON ZITVER, *Primary Examiner.*

B. HELFIN, H. T. MARS, *Assistant Examiners.*

UNITED STATES PATENT OFFICE
CERTIFICATE OF CORRECTION

Patent No. 3,342,875

September 19, 1967

Stanley Selman et al.

It is certified that error appears in the above identified patent and that said Letters Patent are hereby corrected as shown below:

Column 1, line 46, "$FC_2$" should read -- $CF_2$ --. Column 2, line 35, "$CR_2$" should read -- $CF_2$ --.

Signed and sealed this 24th day of March 1970.

(SEAL)
Attest:

Edward M. Fletcher, Jr.
Attesting Officer

WILLIAM E. SCHUYLER, JR.
Commissioner of Patents